United States Patent [19]
Capriotti et al.

[11] Patent Number: 5,974,118
[45] Date of Patent: Oct. 26, 1999

[54] SYSTEM FOR COORDINATING ON-LINE UPDATES OF CALL FLOWS, FUNCTIONS AND VOICE PROMPTS OF A TELEPHONY APPLICATIONS

[75] Inventors: Steven J. Capriotti, Collegeville; David Landolt, Harleysville; Barbara E. Osder, Erdenheim, all of Pa.

[73] Assignee: Unisys Corporation, Blue Bell, Pa.

[21] Appl. No.: 08/947,106

[22] Filed: Oct. 8, 1997

Related U.S. Application Data

[63] Continuation of application No. 08/415,845, Apr. 3, 1995, abandoned.

[51] Int. Cl.$^6$ .................................................. H04M 1/64
[52] U.S. Cl. ....................................... 379/88.22; 379/196
[58] Field of Search ............................. 379/67.1, 88.22, 379/88.23, 88.24, 88.25, 88.28, 196, 197, 199

[56] References Cited

U.S. PATENT DOCUMENTS

| | | | |
|---|---|---|---|
| 4,313,035 | 1/1982 | Jordan et al. | 379/230 |
| 4,602,129 | 7/1986 | Matthews et al. | 379/89 |
| 4,625,081 | 11/1986 | Lotito et al. | 379/88 |
| 4,878,240 | 10/1989 | Lin et al. | 379/67 |
| 4,959,854 | 9/1990 | Cave et al. | 379/157 |
| 5,054,054 | 10/1991 | Pessia et al. | 379/89 |
| 5,133,004 | 7/1992 | Heileman, Jr. et al. | 379/67 |
| 5,163,085 | 11/1992 | Sweet et al. | 379/89 |
| 5,179,585 | 1/1993 | MacMillan, Jr. et al. | 379/88 |
| 5,243,643 | 9/1993 | Satter et al. | 379/88 |
| 5,323,452 | 6/1994 | Dickman et al. | 379/201 |
| 5,349,636 | 9/1994 | Irribarren | 379/89 |
| 5,355,406 | 10/1994 | Chencinski et al. | 379/88 |
| 5,488,650 | 1/1996 | Greco et al. | 379/67 |

Primary Examiner—Fan S. Tsang
Attorney, Agent, or Firm—Steven B. Samuels; Mark T. Starr; Woodcock Washburn Kurtz Mackiewicz & Norris LLP

[57] ABSTRACT

A telephony application capable of being updated while on-line is disclosed. The application supports a plurality of active dialogs with callers, and comprises functions, call flows, voice prompts, and on-line updating versions for making on-line modifications of the functions, call flows, and voice prompts. The modifications are coordinated so that selected sets of functions, call flows and voice prompts can be committed to use while one or more active dialogs are occurring without affecting the active dialog(s).

16 Claims, 2 Drawing Sheets

SYSTEM FOR COORDINATING ON-LINE UPDATES OF CALL FLOWS, FUNCTIONS AND VOICE PROMPTS OF A TELEPHONY APPLICATIONS

This application is a continuation of application Ser. No. 08/415,845, filed Apr. 3, 1995, now abandoned.

FIELD OF THE INVENTION

The present invention generally relates to telephony applications, and more particularly to a telephony application having means for performing on-line updates of call flows, functions, and voice prompts. The invention permits on-line updates to be made to the call flows, functions and prompts without affecting active dialogs.

BACKGROUND OF THE INVENTION

FIG. 1 is a simplified block diagram depicting part of a telephone system comprising a public switched telephone network (PSTN) 10, a network applications platform (NAP) 12, and a number of telephony applications, including a voicemail application 14A, a fax application 14B, a call routing application 14C, and a bank-by-phone application 14D.

The basic elements of any telephony application include call flows, functions, and prompts. Call flows define the personality of the application, i.e., the logical flow of the application interface to the caller (the person that dialed a phone number and was transferred to the telephony application in question). Functions represent the software building blocks employed to implement the desired call flow functionality. A function is computer code and may involve access to an application database. Each function produces a result that determines the path of the associated call flow. Prompts are logical groups or sequences of pre-recorded, typically digitized, voice. Prompts are presented to the caller through control of the call flows.

A class of telephony application creation environments employs a modularized approach whereby the basic elements (call flows, functions, prompts) are logically separated both at the time of creation and during execution. In particular, the call flows are maintained in an interpretative state table, functions reside in executable object code, and prompts reside in a database such as, for example, Unisys' SPeech Interface to NAP, or SPIN, database. Further information about Unisys' Network Applications Platform (NAP) can be obtained from U.S. Pat. No. 5,133,004, Jul. 21, 1992, titled "Digital Computer Platform For Supporting Telephone Network Applications."

In a telephone system of the type depicted in FIG. 1, the network applications platform (NAP) 12 could be located at a local telephone company connected to one or more central offices or switches, or could alternatively be located on the premises of a customer of the telephone company, such as a large or medium-sized company. In the latter case, the NAP 12 would typically be connected to a private branch exchange (PBX) instead of a PSTN.

The present invention was devised during the process of developing a service creation environment (somewhat similar to a compiler and editor) for servicing telephone systems employing telephony applications (voicemail, fax, call routing, bank-by-phone, etc.), and particularly for modifying such applications after they are installed in the customer's telephone system. Telephone customers typically demand 100% system availability, which means that, for a large customer having hundreds or even thousands of employees at a given location, it is extremely difficult to take the telephony application off-line (out of service) for even a short time to make updates or modifications. Therefore, when it becomes necessary to modify the call flows, voice prompts, or functions of an application, the application provider needs a way to make such modifications while the application is kept on-line. Moreover, there is a need to coordinate such modifications so that, in a given dialog, the appropriate versions of call flows, voice prompts and functions are invoked. In other words, once a caller enters into a dialog with the application, the application should not change versions of call flows, voice prompts or functions during that dialog. An "active dialog", then, is a concurrent logical communication path between the application and the NAP, that is maintained in an "active" status, provided the necessary operating conditions are present, e.g., the active dialog is not terminated. However, different versions could be in use at the same time for different dialogs. These needs are particularly acute for high volume telephone systems, which typically cannot be taken out of service without inconveniencing at least some users.

In summary, a disadvantage of modularizing telephony applications into call flows, functions, and prompts is that to maintain proper functionality they all need to be updated in a coordinated fashion when changes are made to any one of the parts. Typically, any combination of changes to the parts will require that the application be taken out of service. The goal of the present invention is to provide a mechanism permitting one to make changes to call flows, functions and voice prompts without taking the application out of service. Preferably, all changes should take effect at the same time so that any new caller will be presented with a coordinated set of call flows, functions and prompts. The present invention meets these goals.

SUMMARY OF THE INVENTION

One key to providing a mechanism for making on-line updates to a telephony application is in how the call flows are maintained at runtime. At any given time, there are plural sets or "versions" of call flows available. One version is loaded during application initialization and one or more versions can be loaded via on-line updates. A software module, referred to herein as "NAPTool agent," associates every new dialog (incoming phone call) with a call flow version indicator ($V_{ID}$). The association between dialog and call flow version is maintained until the dialog is terminated.

The functions associated with a call flow version are contained in a library. Each version of the call flow may be associated with a different function library. The invention permits a function library to be re-installed, a bug to be fixed, or a new function to be added, without taking the application out of service. The invention coordinates new call flows with new functions at the caller or dialog level.

In preferred embodiments of the invention, prompts are maintained and supported outside of the NAPTool agent by a product called "SPIN/PEP" (Speech Interface to NAP/Prompt Expansion Processor). Since it is typical for an update to a telephony application to require new or modified prompts, each set of prompts required by one of its call flow versions is defined in a different SPIN application and is identified by a SPIN application ID. Each call flow version is then associated with a SPIN application ID. During initialization of the telephony application, the NAPTool agent saves this association so that it is available when a call flow version is loaded and can be used to access the required set of prompts.

In preferred embodiments, the NAPTool agent does not have direct control of what prompt versions are associated with a given SPIN application ID. This allows an external module, referred to as the "Installation Manager," to have more control of an installation or update. This is accomplished by having two-phase commits of when updated information (e.g., call flows and prompts) is actually put into production. Initially, the NAPTool agent marks a call flow version as pending instead of putting it directly into production. Both the NAPTool agent and PEP are given a confirmation notification by the installation manager, informing them when to put pending call flows and prompts into production.

Call flows are coordinated with prompts and call flows are coordinated with functions, so inherently prompts are coordinated with functions. The coordination of these entities is performed on a live system and takes effect only on new dialog activity, leaving existing activity unchanged. To accomplish this, the NAPTool agent associates a version of the call flows with every new dialog.

To summarize, the present invention provides a service creation environment in which call flows, function code and prompts can be changed on-line. All of these changes are coordinated together so that they take effect at the dialog (phone call) level.

Other features of the invention are described below.

DETAILED DESCRIPTION OF PREFERRED EMBODIMENTS

Figure 1:
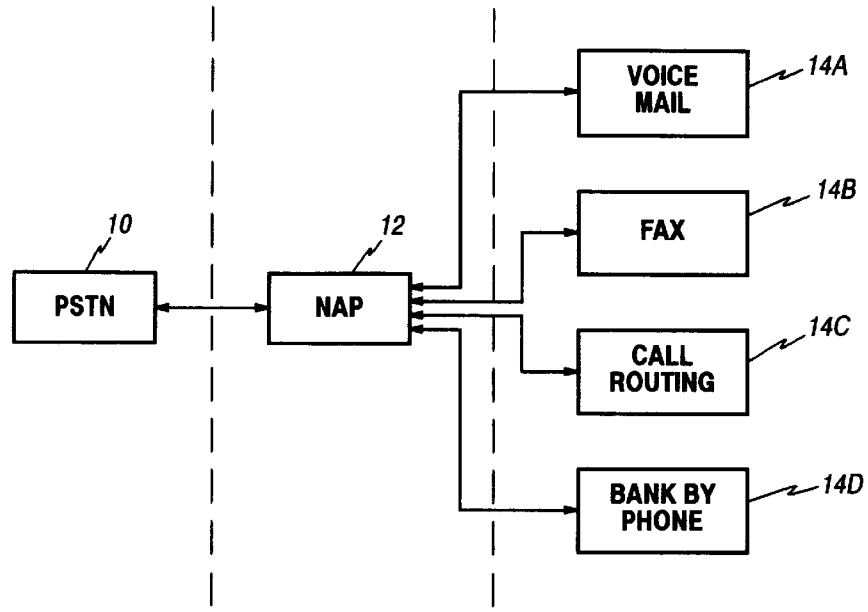
FIG. 1 is a block diagram of a conventional telephone system comprising a variety of telephony applications.
Figure 2:
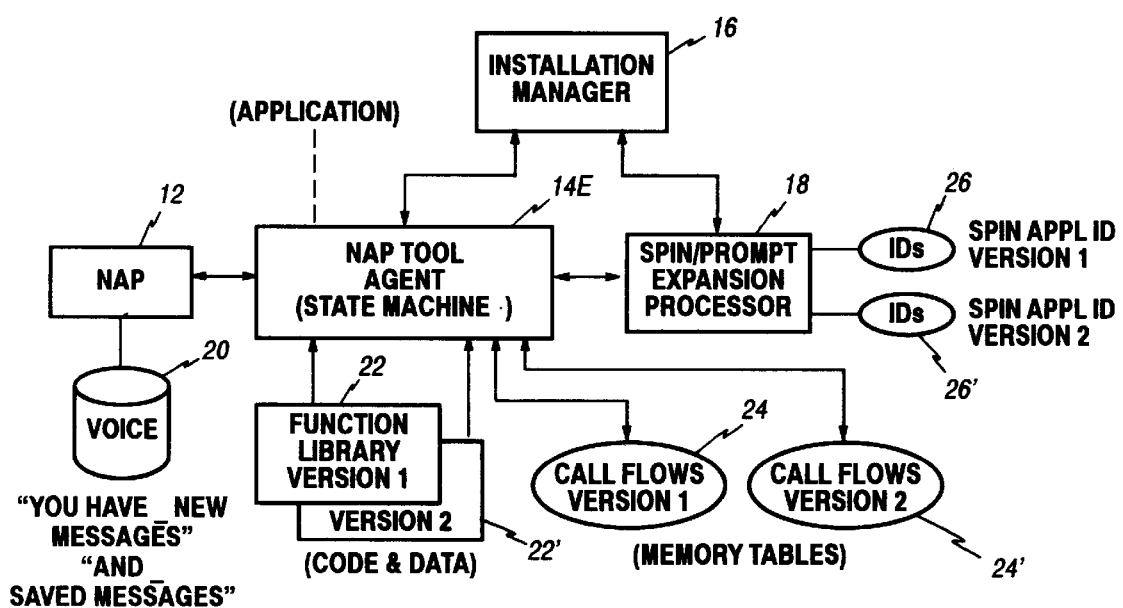
FIG. 2 is a block diagram of a runtime environment according to a preferred embodiment of the present invention.

FIG. 2 depicts a block diagram of one preferred embodiment of a runtime environment in accordance with the present invention. In this embodiment, the network applications platform (NAP) 12 interacts with a NAPTool agent (a state machine) 14E, which in turn interacts with a SPIN/PEP 18. The NAPTool agent 14E and SPIN/PEP 18 are coupled to an Installation Manager 16. The NAP 12 is coupled to a voice database 20 containing digitized sequences of voice messages or prompts. The NAPTool agent 14E has access to a Version 1 function library 22, comprising code and data, and a Version 1 set of call flows 24. The call flows are stored in memory tables. The SPIN/PEP 18 accesses a Version 1 set of application IDs which identify corresponding voice sequences in the voice database 20. The call flows and SPIN application IDs are memory resident.

A key aspect of the present invention is that the runtime environment of FIG. 2 also comprises a Version 2 function library 22', a Version 2 set of memory resident call flows 24', and a Version 2 set of memory resident SPIN application IDs 26'.

The functionality of the system of FIG. 2 will now be described.

The Installation Manager 16, NAPTool agent 14E, and Speech Interface to NAP/Prompt Expansion Processor (SPIN/PEP) 18 are the major program objects. The function library objects each contain all of the functions needed for a given call flow version. As mentioned above, both versions of call flows and both versions of SPIN application IDs represent memory resident data.

As explained above, the preferred embodiments of the present invention employ an application, e.g., the NAPTool agent 14E, to associate every new dialog with a call flow version indicator ($V_{ID}$). The association between dialog and call flow version is maintained until the dialog is terminated. As each association is made between a dialog and a version indicator, a counter is employed to report status on call flow activity and to determine when to reuse call flow table memory 24, 24'. If a request is made to update the call flows and there is no unused table available for a new version, the operator is asked to make a decision on whether to abort the load or recycle (overwrite) the oldest active version of the call flow table.

The functions associated with a version of call flows are contained in the function libraries 22, 22'. Each version of the call flows may be associated with a different function library. The goal here is to be able to re-install a function library, to fix a bug, or to add a new function, without taking the application out of service. The NAPTool agent 14E provides two library declarations (one service, one custom) per call flow version. If a function library must be re-installed, the title (part of the call flow installation parameters) is changed and the call flows are updated on-line. When a new version of call flows requires function library code changes, the library title change allows for the new library to be brought up alongside the original library. Functions accessed by the original call flows are linked to the original function library for the duration of their respective dialogs. Functions accessed from the new call flows are linked to the new function library. This process completely coordinates a new version of call flows with a new version of function library at the caller level.

After each new version of call flows has completely loaded (which may include new library declarations), the NAPTool agent 14E determines whether any current libraries are no longer in use. If a previously loaded library is not in use, it is de-linked to allow future call flow updates the opportunity to reuse the declarations.

In preferred embodiments, prompts are maintained and supported outside the NAPTool agent 14E by the SPIN/PEP 18. Since an update to a telephony application typically requires new or modified prompts, each set of prompts required by one of the call flow versions is defined in a different SPIN application and is identified by a SPIN application ID stored in memory tables 26, 26'. Each call flow version is then associated with a SPIN application ID in the telephony application's installation parameter file (not shown). During initialization of the telephony application, the NAPTool agent 14E saves this association so that it is available when a call flow version is loaded and can be used to access the required set of prompts.

The NAPTool agent 14E does not have direct control of what prompt versions are associated with a given SPIN application ID. The coordination process is left outside the NAPTool agent so that the Installation Manager 16 can have more control of an installation or update. This is accomplished by having two-phase commits of when updated information is actually put into production. Initially, the NAPTool agent marks a call flow version as pending instead of putting it directly into production. Both the NAPTool agent and PEP are given a confirmation notification by the installation manager, informing them when to put pending call flows and prompts into production.

Call flows are coordinated with prompts and call flows are coordinated with functions, so inherently prompts are coordinated with functions. The coordination of these entities is done on a live system and takes effect only on new dialog activity, leaving existing activity unchanged. To accomplish this, the NAPTool agent associates a version of the call flows with every new dialog.

Figure 3A:
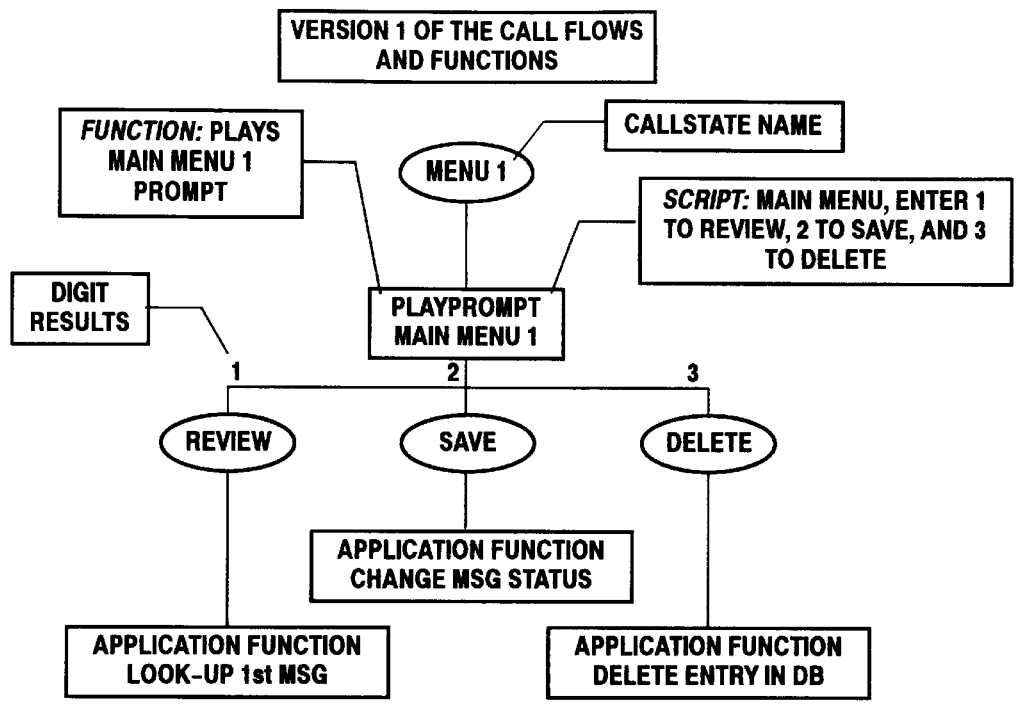
FIG. 3A depicts a first version of call flows and functions.
Figure 3B:
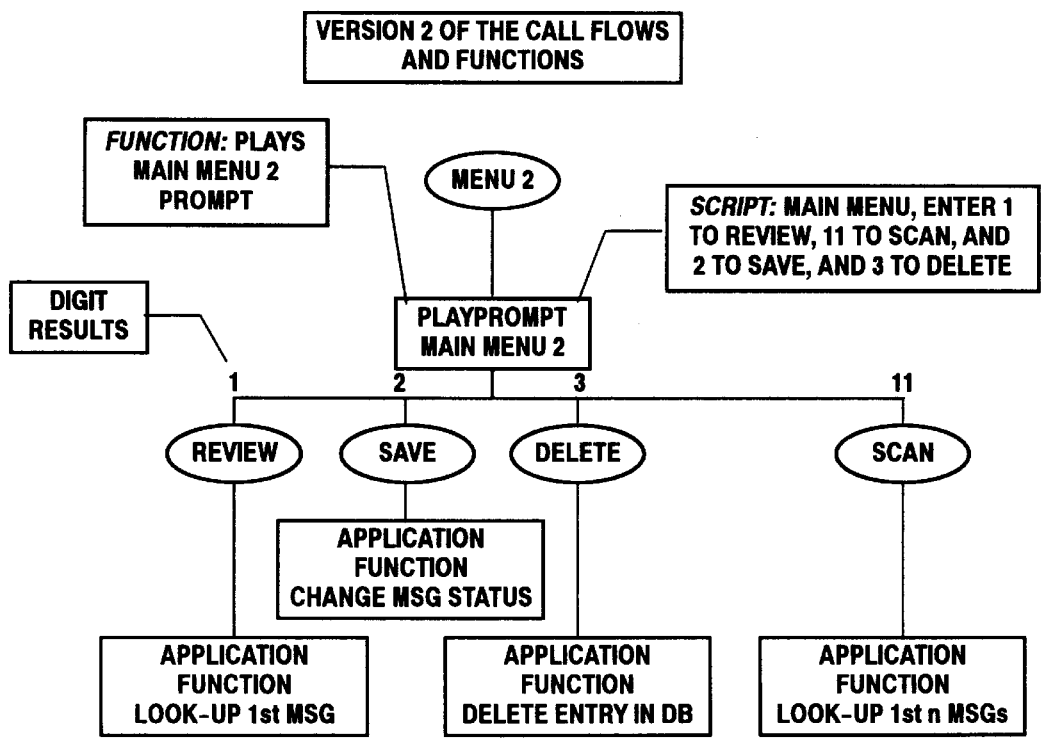
FIG. 3B depicts a second version of call flows and functions.

FIGS. 3A and 3B schematically depict a portion of a call flow that deals with the main menu of a voice mail application. The call flow is made up of state transitions called "callstates." Callstates are represented by the ellipses. The rounded-edge boxes contain descriptive information. The prompt script is what the caller actually hears when a call state associated with the PLAYPROMPT function is executed. Assume the customer wishes to change the user interface of his or her voicemail application. For example, assume the customer has requested that a new option be presented to the caller's main menu. The new functionality desired is to add a scan option so that, if a caller has many messages, he or she may scan the first several seconds of each message. To accomplish this menu change, all three basic elements of the application must change. The call flows must be modified to add a new result to the PLAYPROMPT function. The functions library must be modified by a adding new function ("Scan") for the new result to execute, and the voice prompts must be modified to use the MENU2 prompt script instead of the MENU1 script.

The present invention is not limited to the specific embodiments described above. For example, embodiments of the invention could employ more that two versions of call flows, function libraries, or voice prompts. Moreover, the invention is not limited to voicemail applications, as other applications such as fax, call routing, bank-by-phone, and the like can employ the inventive concept of maintaining "shadow" versions of various parts of the application in question, such that the application can be updated while it is on-line.

We claim:

1. A telephony system comprising functions, call flow elements, and on-line updating means for making on-line modifications of, including additions to and deletions from, said functions and call flow elements while an active, or ongoing, dialog is occurring without affecting said active dialog, wherein each of said functions comprises computer code that causes a computer to perform a predetermined operation, and each of said call flow elements comprises computer code that defines which of said functions are accessible to a caller during a given dialog.

2. A telephony system as recited in claim 1, wherein said on-line updating means comprises uncommitted versions of functions and call flow elements, said uncommitted versions being modifiable while active dialogs using previously committed versions of functions and call flow elements are occurring.

3. A telephony system as recited in claim 2, wherein said uncommitted versions of call flow elements are memory resident.

4. A telephony system as recited in claim 3, further comprising of voice prompts, wherein said voice prompts represent digitized voice sequences stored in a database.

5. A telephony system as recited in claim 4, further comprising an application for associating every new dialog with a call flow version indicator ($V_{ID}$) and maintaining the association until the new dialog is terminated.

6. A telephony system as recited in claim 1, wherein said functions comprise computer code that causes the computer to perform at least the following operations with respect to stored voice messages: review, save, delete, and scan.

7. A telephony system capable of supporting a plurality of active, or on-going, dialogs with callers, comprising a computer, functions, call flow elements, voice prompts, and on-line updating means for making on-line modifications of said functions, call flow elements, and voice prompts, wherein said modifications are coordinated so that selected sets of functions, call flow elements and voice prompts can be committed to use in new dialogs while one or more active dialogs are occurring without affecting the active dialogs; wherein each of said functions comprises computer code that causes said computer to perform a predetermined operation, and each of said call flow elements comprises computer code that defines which of said functions are accessible to a caller during a given dialog.

8. A telephony system as recited in claim 7, wherein said on-line updating means comprises uncommitted sets of functions, call flow elements, and prompts, said uncommitted sets being modifiable while active dialogs using committed sets of functions, call flow elements, and prompts are occurring.

9. A telephony system as recited in claim 8, wherein said uncommitted sets of call flow elements are memory resident.

10. A telephony system as recited in claim 8, further comprising an application for associating every new dialog with a call flow version indicator ($V_{ID}$) and maintaining the association until the new dialog is terminated.

11. A telephony system as recited in claim 8, further comprising an application for associating every new dialog or incoming phone call with a call flow element version indicator ($V_{ID}$) and maintaining the association until the new dialog is terminated; wherein a set of prompts required by a call flow element version is identified such that each call flow element version is associated with an identifier of a set of prompts; and wherein, during initialization of the call flow element, the association between the set of prompts and call flow element version is saved so that it is available for all new dialogs and can be used to access the required set of prompts.

12. A telephony system as recited in claim 11, further comprising means for performing two-phase commits of when modified call flow elements and prompts are put into use, said two-phase commits comprising (1) initially indicating that a call flow element and prompt version are pending, or ready for use but not to be used until committed, and (2) subsequently committing the pending call flow element and prompt version, thus making them available for use in a subsequently-initiated dialog.

13. A telephony system as recited in claim 7, wherein a set of prompts required by a call flow element version is identified such that each call flow element version is associated with an identifier of a set of prompts; and wherein, during initialization of the call flow element, the association between the set of prompts and call flow element version is saved so that it is available for all new dialogs and can be used to access the required set of prompts.

14. A telephony system as recited in claim 7, further comprising means for performing two-phase commits of when modified call flow elements and prompts are put into use, said two-phase commits comprising (1) initially indicating that a call flow element and prompt version are pending, or ready for use but not to be used until committed, and (2) subsequently committing the pending call flow element and prompt version, thus making them available for use in a subsequently-initiated dialog.

15. A telephony system as recited in claim 7, wherein said functions comprise computer code that causes the computer to perform at least the following operations with respect to stored voice messages: review, save, delete, and scan.

16. A method for performing on-line updates of a call flow element in a telephony application, comprising the steps of:

a. making said updates to a version of said call flow element which is memory resident in a network applications platform but not in use by any active dialogs, wherein said updates do not prevent said active dialogs from using said call flow element;

b. indicating that a committed call flow element is committed to use; and c. employing said updated call flow element in dialogs that begin after said indicating step.

* * * * *